United States Patent
Anheier et al.

(10) Patent No.: US 10,422,087 B2
(45) Date of Patent: Sep. 24, 2019

(54) COMPACT PAVER, OPERATING PLATFORM FOR A COMPACT PAVER, AND METHOD

(71) Applicant: BOMAG GMBH, Boppard (DE)

(72) Inventors: Thorsten Anheier, Kobern-Gondorf (DE); Thomas Haubrich, Goedenroth (DE); Thomas Klein, Wehr (DE); Andreas Roesch, Offenbach (DE)

(73) Assignee: BOMAG GMBH, Boppard (DE)

( * ) Notice: Subject to any disclaimer, the term of this patent is extended or adjusted under 35 U.S.C. 154(b) by 1 day.

(21) Appl. No.: 15/859,929

(22) Filed: Jan. 2, 2018

(65) Prior Publication Data

US 2018/0187382 A1    Jul. 5, 2018

(30) Foreign Application Priority Data

Jan. 2, 2017 (DE) .................. 10 2017 000 007
May 11, 2017 (DE) .................. 10 2017 004 553
(Continued)

(51) Int. Cl.
*E01C 19/00* (2006.01)
*E01C 19/48* (2006.01)
*B62D 51/02* (2006.01)

(52) U.S. Cl.
CPC ............ *E01C 19/48* (2013.01); *B62D 51/02* (2013.01); *E01C 2301/40* (2013.01)

(58) Field of Classification Search
CPC .................. E01C 19/22; E01C 19/4873
(Continued)

(56) References Cited

U.S. PATENT DOCUMENTS 3,485,314 A * 12/1969 Herr .................. B60P 9/00
180/11
3,557,672 A * 1/1971 Shurtz ................ E01C 19/4873
404/118
(Continued)

OTHER PUBLICATIONS

Office Action from related U.S. Appl. No. 15/859,938, dated May 31, 2019.

*Primary Examiner* — Thomas B Will
*Assistant Examiner* — Katherine J Chu
(74) *Attorney, Agent, or Firm* — Grossman, Tucker, Perreault & Pfleger, PLLC

(57) ABSTRACT

A compact paver comprising a machine frame, drive motor, travel units, receiving container at the front in relation to the paving direction for receiving paving material, longitudinal conveying device with which the paving material can be conveyed from the receiving container in a rearward direction in relation to the paving direction, transverse distribution device with which the paving material can be distributed on the ground surface transversally to the paving direction, a height-adjustable paving screed for compacting and smoothing the paving material distributed on the ground surface behind the transverse distribution device in the paving direction, an operating platform mounted on the machine frame and arranged behind the receiving container in the paving direction, and an operating platform. And a method for coordinating the operating position of the operating console of the operating platform of the compact paver with a rear operating step and a higher front operating step of the operating platform.

10 Claims, 6 Drawing Sheets

(30) Foreign Application Priority Data

Oct. 4, 2017 (DE) ........................ 10 2017 009 248
Oct. 4, 2017 (DE) ........................ 10 2017 009 249

(58) Field of Classification Search
USPC ................ 404/83, 118; 180/89.13, 326, 330
See application file for complete search history.

(56) References Cited

U.S. PATENT DOCUMENTS

| | | | |
|---|---|---|---|
| 3,874,807 A * | 4/1975 | Puckett | E01C 19/4873 404/110 |
| 3,957,165 A * | 5/1976 | Smith | B66C 13/54 414/460 |
| 4,192,525 A * | 3/1980 | Clark | B62D 51/008 180/11 |
| 4,421,188 A * | 12/1983 | Fredriksen | B62D 33/073 180/327 |
| 4,934,462 A | 6/1990 | Tatara et al. | |
| 4,995,469 A * | 2/1991 | Mikkelsen | B62D 1/22 180/327 |
| 5,086,869 A | 2/1992 | Newbery et al. | |
| 5,106,256 A * | 4/1992 | Murakami | E02F 3/325 172/434 |
| 5,215,403 A * | 6/1993 | Peterson | E01C 19/15 239/672 |
| 5,553,969 A * | 9/1996 | Reed | E01C 19/46 404/101 |
| 5,664,909 A | 9/1997 | Lindgren et al. | |
| 6,276,749 B1 * | 8/2001 | Okazawa | B60N 2/797 296/190.08 |
| 6,560,952 B2 * | 5/2003 | Velke | A01D 34/6806 280/32.7 |
| 7,159,687 B2 | 1/2007 | Dunn et al. | |
| 7,243,756 B2 | 7/2007 | Muraro | |
| 7,347,299 B2 | 3/2008 | Billger et al. | |
| 7,413,377 B2 * | 8/2008 | Pontano, III | E01C 19/48 404/101 |
| 7,540,685 B2 * | 6/2009 | Avikainen | B62D 33/0636 180/327 |
| 7,997,369 B2 | 8/2011 | Bacon et al. | |
| 8,041,485 B2 | 10/2011 | Prasetiawan et al. | |
| 8,267,619 B2 * | 9/2012 | Munz | E01C 19/48 404/101 |
| 8,356,958 B2 * | 1/2013 | Braun | E01C 19/48 404/101 |
| 8,388,262 B2 | 3/2013 | Klein et al. | |
| 8,590,983 B2 | 11/2013 | Berning et al. | |
| 8,864,410 B1 * | 10/2014 | Kopacz | E01C 19/48 404/118 |
| 8,944,719 B2 | 2/2015 | Frelich et al. | |
| 9,045,871 B2 | 6/2015 | Graham et al. | |
| 9,051,696 B1 | 6/2015 | Coats et al. | |
| 9,212,457 B2 | 12/2015 | Wagner et al. | |
| 9,249,544 B2 | 2/2016 | Caputo | |
| 9,783,056 B2 * | 10/2017 | Klein | E02F 9/2004 |
| 9,938,673 B2 | 4/2018 | Ellwein | |
| 9,963,838 B2 | 5/2018 | Oettinger | |
| 2004/0190991 A1 | 9/2004 | Quenzi et al. | |
| 2005/0045409 A1 | 3/2005 | Fenelli et al. | |
| 2005/0069385 A1 | 3/2005 | Quenzi et al. | |
| 2007/0012498 A1 | 1/2007 | Schulz | |
| 2010/0102609 A1 | 4/2010 | Confer et al. | |
| 2013/0264139 A1 * | 10/2013 | Braun | E02F 9/16 180/322 |
| 2015/0078824 A1 * | 3/2015 | Haro | E01C 19/48 404/96 |
| 2015/0217664 A1 | 8/2015 | Levin | |
| 2016/0102439 A1 * | 4/2016 | Jorgensen | E01C 19/4873 404/118 |
| 2019/0078273 A1 * | 3/2019 | Neisen | E01C 23/00 |

\* cited by examiner

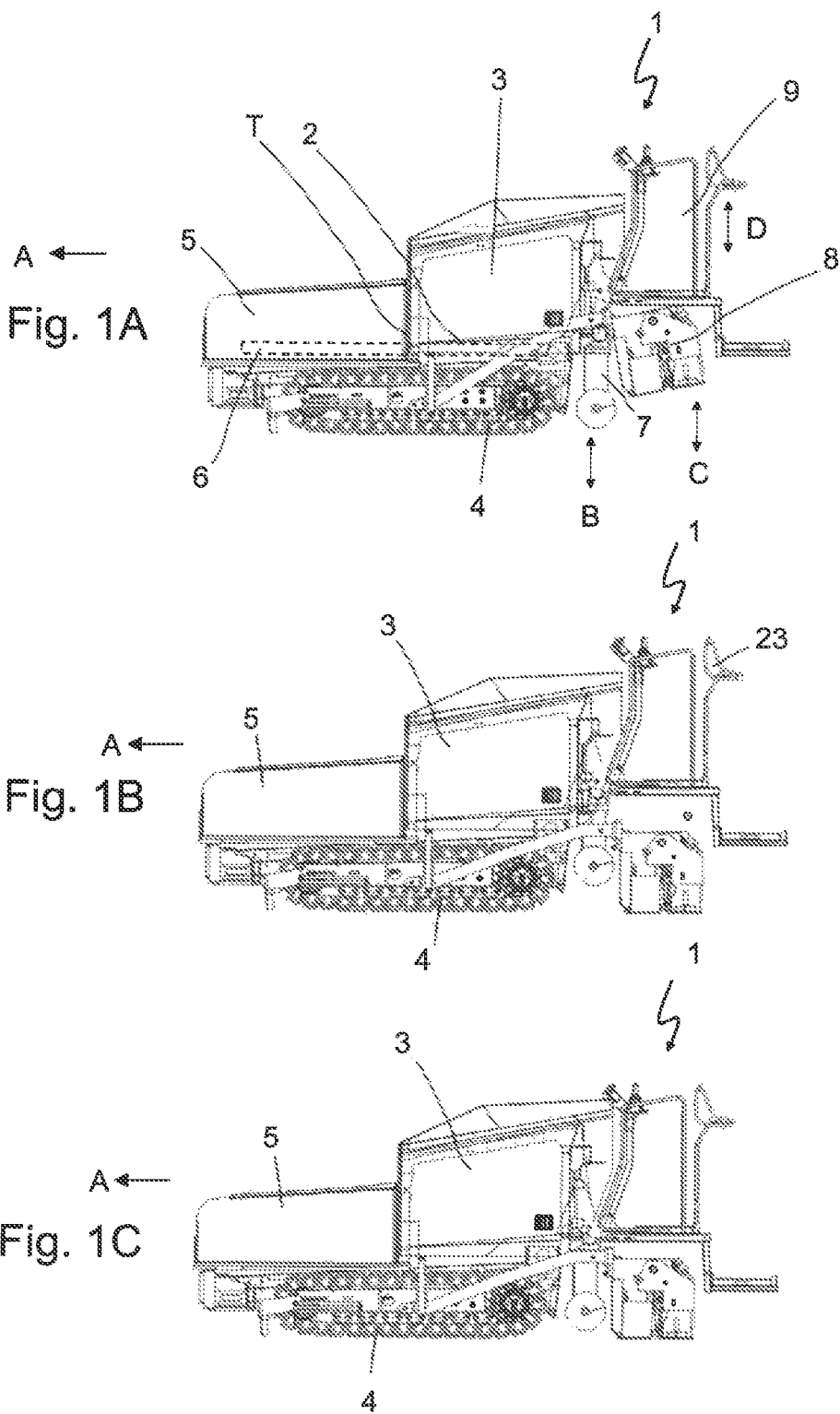

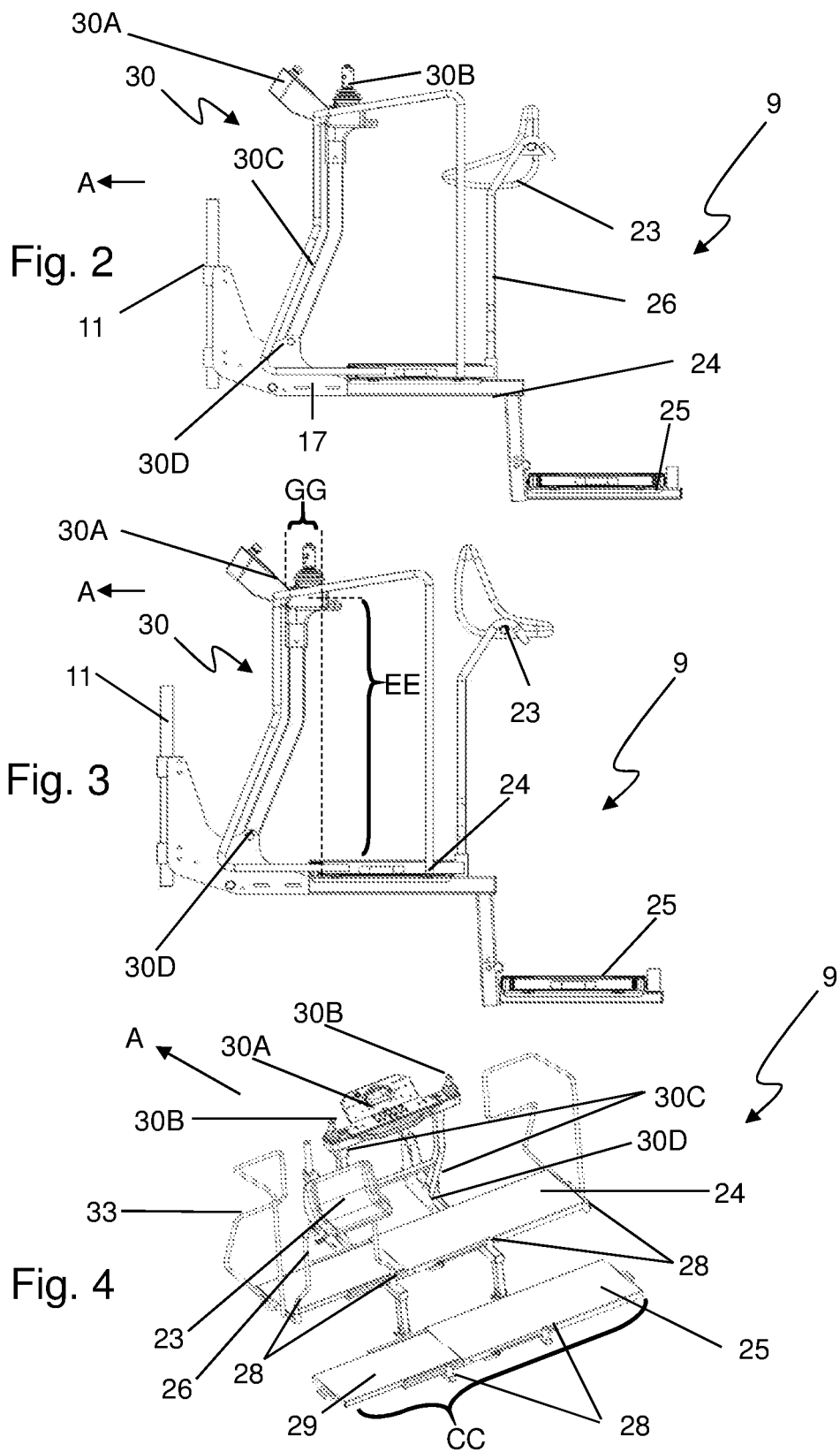

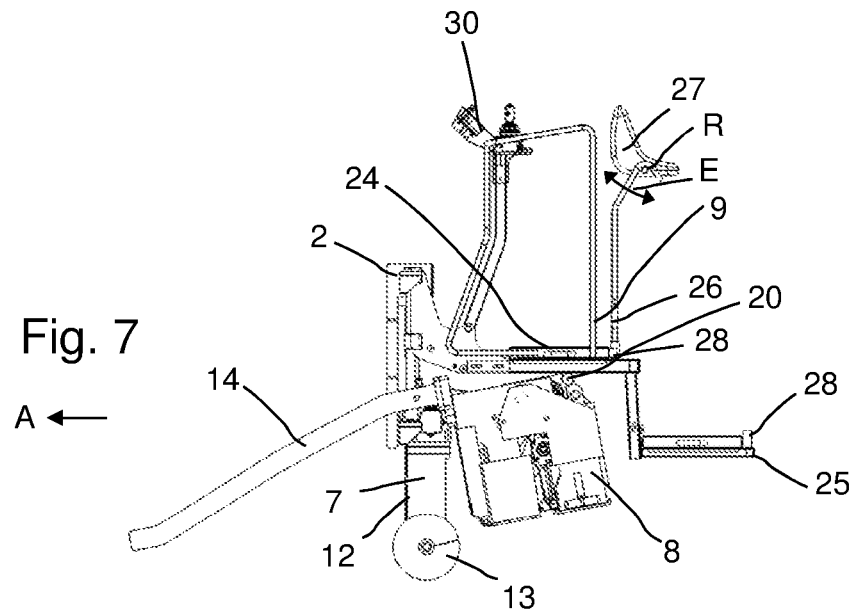
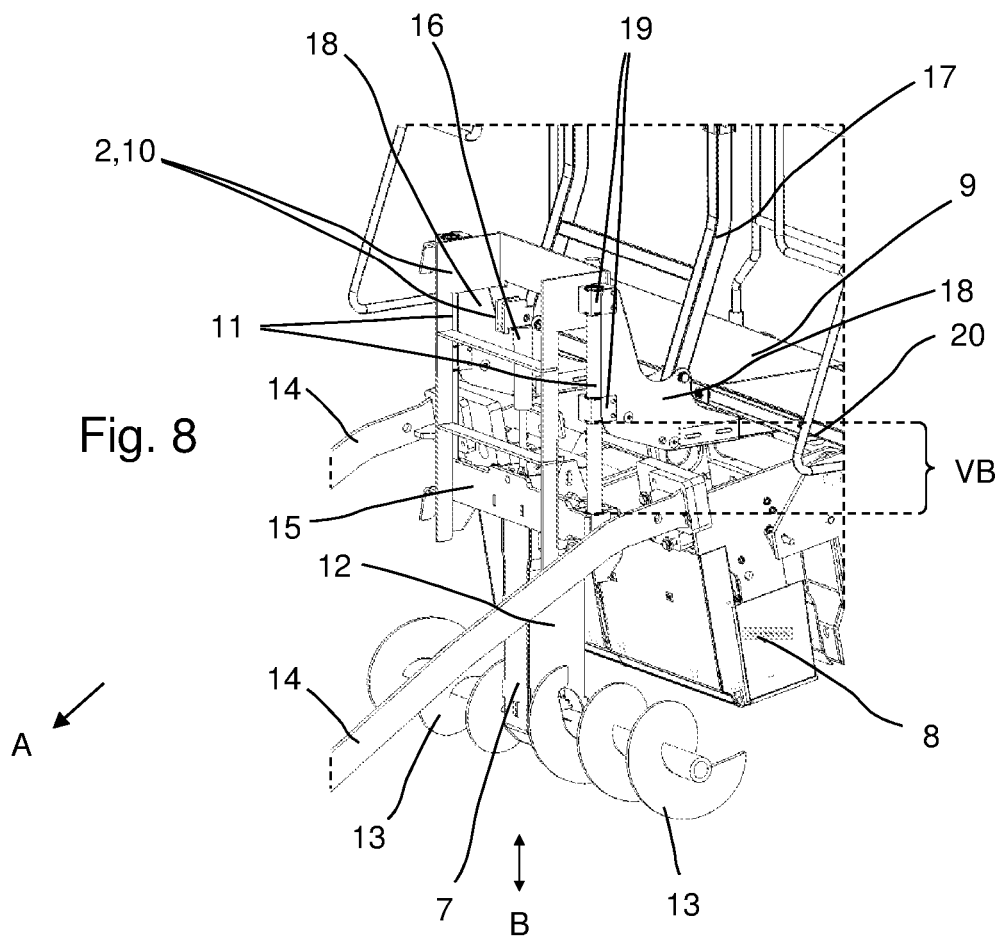

COMPACT PAVER, OPERATING PLATFORM FOR A COMPACT PAVER, AND METHOD

FIELD

The invention relates to a compact paver, an operating platform for a compact paver as well as a method for coordinating the operating positions of an operating console and a seat of an operating platform of a compact paver.

BACKGROUND

Compact pavers constitute a subgroup of road pavers and are used in conventional ways for the paving of paving material, e.g. asphalt or a similar surface material. Pavers with an operating weight (with an empty receiving container) of less than 10 t and in particular less than 8 t and/or a track width of less than or equal to 1500 mm are generally designated as compact pavers. Compact pavers are used for paving surface materials, in particular in spatially restricted working environments, e.g. inside buildings and/or when the implemented paving width is narrow, e.g. the width of an average sidewalk and/or a milled track. The applicant manufactures such a known compact paver e.g. under the type designation BF 223C.

Essential elements of a generic compact paver are a machine frame, a drive motor, travel units, a receiving container located at the front in the paving direction for receiving paving material, in particular asphalt, a longitudinal conveying device with which paving material is conveyed from the receiving container to the rear in relation to the paving direction, a transverse distribution unit that is in particular height-adjustable in relation to the machine frame and which distributes the paving material on the ground surface transversely to the paving direction, a paving screed that is height-adjustable in relation to the machine frame for compacting and smoothing the transversely distributed paving material behind the transverse distribution unit in relation to the paving direction as well as an operating platform arranged behind the receiving container in the paving direction and mounted on the machine frame. The operation of the compact paver is carried out from the operating platform. An operator thus either stands on the operating platform or sits, if available, on a seat arranged on the operating platform.

The compact paver generally comprises the essential elements of a tractor and a paving screed. The paving screed is mounted on the machine frame of the tractor in a known manner via corresponding towing arms so as to float during paving operating on the paving material and is pulled by the tractor over the paving material distributed on the ground surface. The paving screed is mounted in a height-adjustable manner vis-à-vis the machine frame. A cylinder-piston unit is generally provided for this purpose, which connects the towing arms in the rear area and/or to the paving screed itself for the purposes of the height adjustment in relation the machine frame. It is also known to vary the angle of application of the paving screed by means of a height adjustment of the towing points of the towing arms. The machine frame designates the essential supporting structure of the tractor. The tractor further comprises a drive motor, conventionally a diesel motor, which provides the required power for the paving operation including propulsion. The compact paver according to the invention is, as is customary with generic compact pavers, configured to be self-propelling and thus has travel units, e.g. crawler tracks or wheels, driven by the drive motor. The loading of the compact paver with paving material occurs via the receiving container, which is loaded during paving operation accordingly, e.g. by a suitable transport vehicle, in particular a truck or a wheel loader. The receiving container generally comprises adjustable side walls in order to move the paving material provided in the receiving container, e.g. precisely in the direction of the longitudinal conveying device. For this purpose, in particular the side receiving container walls can be configured in such a manner that they can be swung up and/or slid in a horizontal direction. The longitudinal conveying device can be, e.g., a scraper conveyor or something similar arranged essentially in the middle in relation to the receiving container. The essential task of the longitudinal conveying device is the conveyance of the paving material within the compact paver from the receiving container in a rearward direction, in particular in order to be deposited on the ground surface in front of the paving screed in the paving direction. The provided transverse distribution device, in particular a known screw conveyor, which is in particular rotatable about a horizontal axis of rotation transverse to the working direction, permits a transverse distribution of the paving material delivered from the receiving container via the longitudinal conveying device, generally centrally. In order to make adjustments for different paving thicknesses, it is also already known to vary the height of the transverse distribution device vis-à-vis the machine frame or ground surface. In the case of greater paving thicknesses the transverse distribution device is raised in relation to the machine frame and vice versa. This adjustment can be, e.g., manually actuable and driven by mechanical means, in particular by means of a cylinder-piston unit. The paving screed is constructed in a manner known in the prior art and comprises e.g. extendable screed parts, tamping devices, heating devices, narrowing parts, etc. It is essential that the paving screed is height-adjustable in relation to the machine frame in order to permit different paving thicknesses.

The operation of a generic compact paver is conducted by an operator located on the operating platform mounted on the machine frame. This operator frequently controls the compact paver during the paving process completely on his or her own and without the help of further auxiliary personnel. Thus, from the operating platform, the operator must monitor and/or control the fill level or amount of paving material in the receiving container, the loading process from the transport vehicle for filling the receiving container, the actual paving process—in particular with respect to paving thickness and paving quality—as well as the speed and direction of the compact paver. For the operation of the concrete working and driving functions of the compact paver, it is known to mount one or several suitable operating consoles, into which corresponding control commands can be entered, at a location that is easy to reach for the operator on the operating platform. In order to be able to perform all of these tasks adequately, it is particularly important that the driver has a good overview of the compact paver and its surroundings from the operating platform, in particular in different paving situations.

In this context, it is already known from US2016/0102439A1 to connect the entire operating platform in a height-adjustable manner to the tractor by means of a four-bar linkage. An operator on the operating platform can thus e.g. lower the operating platform in order to work under a low ceiling. The operation of the paver occurs by means of an operating console arranged in a fixed manner on the tractor. This solution can certainly be improved upon, however, as, among other things, its implementation is relatively costly, while the operator further has to adopt various postures in order to reach the operating console depending on the height of the operating platform.

SUMMARY

The object of the invention is thus to indicate a possibility for the improvement of the operating comfort of a compact paver for an operator.

The object is achieved with a compact paver, an operating platform for a compact paver and a method for adjusting the operating position of an operating console in relation to the position of a seat in accordance with the independent claims. Preferred embodiments are indicated in the dependent claims.

An essential idea of the invention is that the operating platform has two operating steps arranged so as to be offset in relation to one another in the paving direction. These are arranged in relation to one another in such a way that the forward operating step in the paving direction of the compact paver is positioned vertically higher, e.g. for a good overview of the paver and surroundings from the operating platform, than the rear operating step in the paving direction, e.g. for paving operations when there is reduced headroom. The two operating steps are thus positioned in an ascending manner in relation to one another when viewed in the paving direction. Both the front operating step and the rear operating step provide the operator with sufficient standing room for operating the compact paver over longer periods of time. With the help of the operating steps arranged so as to be offset in relation to one another in the vertical direction, the driver can choose different standing heights by simply switching operating steps during the operation of the compact paver, for example, between the lower operating step in operating situations with less headroom and the higher step in operating situations with more headroom in order to improve the overview of the working situation. Moreover, the position of the operating console may be adjusted simultaneously. In accordance with the invention, the operating console is thus mounted in an adjustable manner on the compact paver, specifically between a higher operating position and a lower operating position. The higher operating position permits a comfortable handling for an operator on the front operating step, while the lower operating position permits a comfortable handling for an operator on the rear step. As a result of the relative arrangement of the front and rear operating steps described above, a configuration of the adjustable mounting of the operating console according to which the higher operating position is closer to the receiving container in the paving direction of the compact paver and higher than the lower position of the operating console is particularly preferred. This way, the different positions of the operating console, i.e. the higher and lower operating positions, thus essentially follow from the relative positions of the front and rear operating steps in relation to one another so that the operating console can be reached by the operator, at least in similar spatial conditions, from the operating platform from both operating steps. The operator thus more or less does not have to reposition himself in order to use the operating console from the front or rear operating step.

The specific configuration with regard to the adjustability of the operating console between a higher operating position and a lower operating position can vary. There can thus be a linear adjustability by means of a suitable mounting. It is, however, preferable to mount the operating console in a manner that it can be swivelled between the higher and lower operating positions. The specific configuration of the adjustment mechanics can be achieved by relatively simple and robust solutions, e.g., by using a pivot joint. It is essential that one and the same operating console can be adapted by means of this adjustability to the higher operating position and to the lower operating position so that the same operating console can be used from both operating levels in approximately identical spatial conditions.

In principle, it is possible to connect the operating console e.g. to the machine frame of the compact paver in an adjustable manner. However, it is preferable if the operating console and the rest of the operating platform form a common constructional unit and the operating console is in particular also adjustably mounted on the operating platform, in particular on a supporting structure, e.g. a supporting frame, of the operating platform. A joint construction of the operating platform with the operating console facilitates the application of the invention to an operating platform that is height-adjustable in relation to the machine frame of the compact paver. The mounting/articulated connection is carried out by means of a suitable mounting device such as e.g. a joint or comparable devices.

Preferably, the operating console comprises at least one manually actuable operating element, while the adjustability, i.e. the range of movement, of the operating console—rendered possible by means of the mounting device—is ideally configured in such a way that in particular the vertical and/or horizontal distance of the at least one operating element in the higher operating position to the front operating step essentially corresponds to the vertical and/or horizontal distance of the at least one operating element in the lower operating position to the rear operating step, in particular with a maximum deviation of +/−20%, in particular a maximum deviation of +/−15% and especially a maximum deviation of +/−10%. This way, the operator can operate the operating console in the higher operating position from the upper operating step and in the lower operating position from the lower operating step in the same height conditions so that only minor adjustments of the operator's own position to the different operating levels are necessary. Additionally or alternatively, the adjustability of the operating console is configured in such a way that the horizontal and/or vertical distance of the at least one operating element in the higher operating position to the front operating step, in particular to its front edge, essentially corresponds to the horizontal and/or vertical distance of the at least one operating element in the lower position to the rear operating step, in particular its front edge, in particular with a maximum deviation of +/−15%, and especially with a maximum deviation of +/−10%.

With respect to the specific configuration of the front and rear operating steps, a plurality of other advantageous embodiments are possible and comprised by the invention. For example, the front and rear operating steps are ideally arranged so as to be directly adjacent to one another in the working direction.

Additionally or alternatively, the front and rear operating steps are preferably configured as a rigid cohesive structure by means of a supporting frame. However, it is also ideal if the front operating step is fixedly arranged in a supporting frame of the operating platform while the rear operating step can be swung up or slid from an extended or lowered operating position into a space-saving transport position on the machine frame, which ideally reduces the overall length of the compact paver. In this embodiment, in contrast to the front operating step, the rear operating step is mounted in an adjustable manner between an operating position and a transport position, in particular on a supporting frame of the operating platform.

It is essential for the concrete configuration of the front and rear operating steps that they both provide sufficient standing room for the operator to operate the compact paver. The measurements of both operating steps of the operating platform are such that the latter provide the operator of the compact paver with a comfortable amount of standing room. Specifically, the standing room of the front and/or rear operating steps each preferably comprises a longitudinal extension in the paving direction of the road paver between its front edge and its rear edge of at least 300 mm and especially of at least 350 mm. The horizontal width, i.e. the extension transverse to the paving direction of the compact paver, of the front and rear operating step preferably extends continuously over at least 90% and in particular over at least 95% of the track width of the travel units (e.g. wheels, tracks) of the compact paver.

A broad range of possibilities is also available with respect to the vertical distance between the standing surfaces of the front and rear operating steps, although a vertical distance between the two standing surfaces in the range of 300 mm to 600 mm has proven particularly suitable for conventional purposes. This way, a comfortable stepping height is observed while a sufficiently large vertical distance is simultaneously attained in order to improve operating comfort in a significant fashion.

Different advantageous embodiments of the invention are also possible with respect to the configuration of the operating console and its mounting/adjustability. It is particularly preferable, e.g. if the operating console is pivotable between the higher operating position and the lower position, in particular by means of a pivot joint. The pivot angle between the lower operating position and the upper operating position here is ideally less than 70° and in particular less than 45° and/or at least greater than 25° and in particular greater than 30°. The pivot angle is preferably determined here in a vertical plane perpendicular to the pivot axis. The operating console is particularly preferably connected to the supporting frame of the operating platform in a pivotable fashion, in particular in the area of the operator's feet if standing on the front operating step. Additionally or alternatively, the operating console preferably comprises an operating panel with at least one operating element and at least one and in particular two supporting bars spaced apart from one another horizontally and transversely to the paving direction, at the foot of which the mounting device, in particular a pivot joint, is arranged, while the operating panel with the at least one manually actuable operating element, in particular an operating joystick, is arranged at the top of the supporting bars.

It is important that a reliable operation of the operating console is possible in the upper operating position and in the lower operating position. It is thus preferred to provide a releasable mechanical locking device, e.g. in the form of a spring-loaded locking bolt and/or a releasable clamping connection, by means of which the operating console can be kept or locked in the upper operating position and/or in the lower operating position. Particularly suitable in this context is also a toothed mechanism, in particular one interconnecting with a spring-loaded engaging element. For this purpose, a toothed area can be provided in a fixed manner on the operating console, in particular at the foot of the console and/or close to the pivot joint, which receives an engaging element, in particular an engaging element mounted on the supporting frame of the operating platform in an adjustable manner. Ideally, the locking device is configured so as to be manually releasable. It is also optimal if the locking and/or releasing of the locking device occurs by means of a manual actuation from the operating panel, e.g. by means of a control lever. The locking device is preferably actuable, i.e. releasable and/or lockable, by hand and/or by foot.

It can be advantageous if the mounting of the operating console is configured in such a way that it is continuously adjustable between a lower operating position and a higher operating position. The operating console can also be exclusively lockable in a single lower operating position and a single higher operating position. An adjustability in steps, e.g. as a result of a graduated locking mechanism, can also be provided. The graduated locking mechanism here is ideally configured in such a manner that the different locking positions are spaced apart from one another by a distance of at least 3° and/or a maximum of 8°, in relation to the pivot axis of the operating console on the supporting frame.

In order to facilitate a more extensive adjustment in particular to the different body sizes of different operators, i.e. beyond a simple adjustability between a lower operating position and a higher operating position, e.g. the height of the operating console can also be adjustable, specifically e.g. by means of height-adjustable supporting bars.

Furthermore, the operating panel can be adjusted in relation to the at least one supporting bar, simultaneously with and/or independently of an adjustment of the operating console between the lower operating position and the higher operation position, in order to e.g. maintain an existing inclined position of the operating panel both in the lower operating position and in the higher operating position when viewed in the paving direction. For this purpose, e.g. a four-bar linkage and/or a suitable articulated mounting can be used. This way, nearly identical operating conditions can be created for the operator standing on the front or rear operating step. Alternatively, the operating panel can, however, also be connected to the at least one supporting bar in a rigid fashion. This renders the construction easier and is viable in particular when the pivot angles of the operating console between the higher operating position and the lower operating position are relatively small.

In order to obviate the necessity of operating the compact paver continuously from a standing position, the operating platform preferably comprises a driver's seat. With respect to the specific configuration of the seat, there is a plurality of preferred embodiments that fall within the scope of the invention. Additionally or alternatively, a back support can also be provided. This allows the operator in an upright operating position on the operating platform to lean against the back support. This way, it can specifically be provided that the seat or back support is adjustable and/or moveable, in particular readily insertable, between at least two operating positions within the operating platform, in particular a first position associated with the front operating step, and a second position associated with the rear operating step. In the first operating position, the operator can thus switch from a standing position on the front operating step to a sitting operating position without having to descend from the front operating step and without having to change the position of the operating console. The same applies to the second position of the seat on the rear operating step. In this regard, it has proven particularly preferable if the changing between the first and the second position of the seat or back support occurs by means of an extraction/reinsertion of the seat/back support. For this purpose, the seat/back support is extracted from a first fixture and inserted into a second fixture. Additionally or alternatively, it is also possible to associate several operating positions or insertion positions of the seat/back support with the front operating step and/or the rear operating step. For this purpose, the seat/back support is moveable, in particular insertable, between two operating positions, in particular a right operating position and a left operating position and/or a middle operating position, in relation to the paving direction of the compact paver, on the operating platform on one and the same operating step, in particular on both the front operating step and the rear operating step.

Besides the position of the seat in itself, advantageous embodiments of the specific configuration of the seat are also possible. The seat can in particular comprise a seat shell that is adjustable between a sitting operating position and a standing operating position. The operator can sit on the seat shell in the sitting operating position. In the standing operating position, on the other hand, he/she can lean against a part of the seat shell. The advantages of the seat and the back support for the comfort of the operator are thus combined here. The adjustment between the sitting operating position and the standing operating position can also occur e.g. in that the seat shell is pivotable about a horizontal axis in relation to its mounting element. This can be achieved particularly easily, however, if the seat shell including the mounting element is turned about a vertical axis, in particular by means of an extraction/reinsertion of the seat shell itself or of the seat (including the mounting element) as a whole. This way, the back side of the seat can be used for leaning. It is further possible that the seat comprises further functions, e.g. integrated operating elements and/or a sitting and leaning segment, e.g. an adjustable seat shell, etc. Furthermore, the seat can comprise at least one releasable mechanical locking device, e.g. a spring-loaded locking bolt, by means of which the seat can be locked in the first and/or second position and/or a right, left or middle operating position and/or a sitting operating position and/or a standing operating position.

Preferably, the elements permitting the adjustability of the operating console and the positioning of the seat, in particular the seat shell, or of the back support are configured in such a way, i.e. the operating console and the seat/back support are mounted and positioned on the operating platform so as to be adjustable in relation to one another in such a way that in particular the horizontal and/or vertical distance of at least one operating element of the operating console and in particular of the entire operating console in the higher operating position to the seat, in particular the seat shell, or back support in the first position essentially corresponds to the horizontal and/or vertical distance of the at least one operating element of the operating console in the lower operating position to the seat, in particular the seat shell, or back support, in particular with a maximum deviation of +/−15% and especially with a maximum deviation of +/−10%. This ensures at least very similar operating conditions for both operating levels.

Alternatively, it can also be preferable if the elements permitting the adjustability of the operating console and the positioning of the seat, in particular the seat shell, or back support are configured in such a way, i.e. the operating console and the seat/back support are adjustable in relation to one another in such a way that in particular the horizontal distance and/or the vertical distance of at least one operating element of the operating console and in particular of the entire operating console in the higher operating position to the seat, in particular the seat shell, or back support in the first position is smaller than the horizontal and/or vertical distance of the at least one operating element of the operating console in the lower operating position to the seat in the second position, in particular the seat shell, or back support by a factor of 0.9, in particular at least by a factor of 0.8 and especially by a factor of 0.7. This also creates very comfortable operating conditions from both operating positions.

Ideally, the operating platform is mounted in a vertically adjustable manner in relation to the machine frame. In practice, it has proven particularly useful if the operating platform is configured so as to be height-adjustable in relation to the machine frame in such a manner that the height adjustment of the operating platform is coupled to a height adjustment of the paving screed and/or to a height adjustment of the transverse distribution device. Consequently, although the operating platform according to the invention is mounted, in particular directly, on the machine frame, it is also adjustable in the vertical direction in relation to the latter. Moreover, the height adjustment of the operating platform is not completely free, but occurs by means of a connection of the height adjustment of the operating platform to the height adjustment of the paving screed and/or the transverse distribution device. This renders possible the adjustment of the height of the operating platform in relation to the machine frame—in particular in view of the paving thickness to be attained in the current working situation and/or according to the current operating mode, in particular either a transport or a paving operation—without the operator having to perform a separate adjustment. Decisive for a height adjustment of the operating platform is thus a height adjustment of the transverse distribution device and/or the paving screed. This creates an optimal overview of the machine from the operating platform for the operator of the compact paver in different working conditions. At the same time, the operator is relieved of the burden of additionally having to adjust the respective heights of the paving screed and/or transverse distribution device and operator platform independently of each other, which thus simplifies overall handling considerably.

In principle, it is possible for the operating platform to further comprise its own, separate drive for powering its height adjustment. The coupling with the height adjustment of the transverse distribution device and/or paving screed in this case can occur mechanically and/or electronically e.g. by means of a control unit. Preferably, the height adjustment of the operating platform is driven indirectly in such a manner that a drive unit for the height adjustment of the paving screed and/or transverse distribution device triggers the height adjustment of the operating platform, in particular at least partially. According to this embodiment, the operating platform thus does not have its own separate drive device for height adjustment, but is rather passively controlled by the height adjustment of the paving screed and/or transverse distribution device. The latter have their own drive unit for height adjustments, in particular respectively in the form of at least one cylinder-piston unit, an electric motor, etc. In the case of an adjustment of their height, the transverse distribution device and/or paving screed thus carry the operating platform along, at least partially. This does not mean that a height adjustment of the operating platform necessarily occurs every time there is a height adjustment of the transverse distribution device and/or paving screed. However, if the height of the operating platform is adjusted, then it is the result of a parallel height adjustment of the transverse distribution device and/or paving screed. This way, a separate adjustment drive solely for adjusting the height of the operating platform is not necessary and the operator does not have to trigger and control e.g. the height adjustment of the operating platform separately.

Ideally, the operating platform is mounted, in particular directly, on the machine frame in a height-adjustable manner, in particular by means of a linear sliding guide mechanism with an essentially vertical sliding direction. This way, a particularly reliable height adjustment of the operating platform can be obtained. A mounting directly on the machine frame means here that the operating platform is connected to the machine frame directly by means of the guiding mechanism. The elements running inside the guiding mechanism on the machine frame thus move together with the rest of the operating platform, in particular in a vertical direction. This way, a relatively simple overall design can be achieved.

The transmission of the height adjustment movement of the paving screed and/or transverse distribution device to the operating platform can be attained in different ways. For example, it is possible to provide an adjustment transmission for the force transmission between the paving screed and/or the transverse distribution device, which translates the adjustment movement of the transverse distribution device and/or paving screed into a height adjustment of the operating platform. It is preferable, however, if a lifting tab is provided, in particular directly, on the paving screed and/or on the transverse distribution device, the lifting tab being configured in such a way that it respectively strikes a tab counterpart on the operating platform. By means of the lifting tab it is possible for the paving screed and/or the transverse distribution device, when a height adjustment is being carried out, to carry the operating platform along in the vertical direction or to limit its gravity-induced downward movement. The tab counterpart designates here the point or area on the operating platform that the paving screed and/or transverse distribution device contacts in order to adjust the height of the operating platform.

If both the paving screed and the transverse distribution device respectively have a lifting tab, the tab counterpart for the paving screed and the tab counterpart for the transverse distribution device are ideally arranged on the operating platform in an offset manner in relation to one another, in particular horizontally. As the paving screed in the rear area is pulled by the tractor, the tab counterpart for the paving screed is in particular arranged behind the tab counterpart for the transverse distribution unit in the paving direction. This way, the sequential arrangement of the tab counterparts mirrors the sequential arrangement of the paving screed and the transverse distribution unit in the paving screed, which gives rise to a relatively compact overall arrangement.

Ideally, the operating platform is not lowered below a maximum lowered position in relation to the machine frame of the tractor. This can be achieved advantageously by providing a lowering stop on the machine frame, which determines the maximum point to which the transverse distribution device and/or the operating platform can be lowered and against which the transverse distribution device and/or the operating platform strike when the maximum lowered position is reached. By means of the lowering stop, a decoupling of the positioning of the operating platform in relation to the height of the transverse distribution device and/or paving screed is possible when the latter are lowered. In other words, the operating platform is no longer adjustable in a downward direction in relation to the machine frame as of a certain lowered position. Additionally or alternatively, the lowering of the transverse distribution device can be limited by means of a lowering stop on the machine frame. Both alternatives have the advantage that in particular the mounting of the operating platform can be decoupled from the paving screed during a paving operation, in particular when the paving screed is lowered onto the paving material. This way, e.g. the weight of the operator no longer affects the floating paving screed so that the paving results achieved are more even.

Depending on the operational conditions—e.g. on whether the compact paver is in transport or in paving operation and/or on the paving thickness to be attained—the position of the paving screed in relation to the transverse distribution device in the vertical direction can vary significantly. In order to facilitate an optimal height of the operating platform in different scenarios, it is advantageous in accordance with the invention if the operating platform is coupled with both the height adjustment of the paving screed and the height adjustment of the transverse distribution device, the coupling preferably being configured in such a manner that, in the case of a lifting adjustment of the paving screed or of the transverse distribution device, the raised element can decouple the other element from its coupling with the operating platform. This means that, depending on the position of the transverse distribution device in relation to the paving screed and on the position of both in relation to the machine frame, the operating platform is held either by the paving screed or the transverse distribution device or the machine frame in its raised position. If both devices are holding the paving screed simultaneously and if one of these devices is then raised in the vertical plane, only this device triggers the height adjustment or raising of the operating platform. If both devices are holding the paving screed simultaneously and one of these devices is lowered in the vertical direction, the elevation of the operating platform does not change, as it is then held by the device positioned higher in the vertical plane. These functionalities are thus based on a virtual "zero position" in which both the transverse distribution device and the paving screed hold the operating platform in a vertical direction. The "zero position" thus lies in a vertical range. It is essential that the operating platform is held at its elevation within its vertical range of adjustment by the device positioned higher in relation to the zero position. This way, it is ensured that the operating platform is constantly raised to a sufficient degree in relation to the transverse distribution device and the paving screed.

The height adjustment of the transverse distribution device preferably comprises a guiding rail mechanism arranged on the machine frame, in particular in the form of vertically rising track spaces. This permits a robust adjustment movement in a vertical direction. The maximum travel distance of the transverse distribution device downward and/or upward can be limited by stops arranged on the guiding rail mechanism.

Ideally, the operating platform engages in the same guiding device as the transverse distribution device on the machine frame. Preferably, the guiding device is a guiding rail mechanism. Both the transverse distribution device and the operating platform thus run in a common guiding rail. This way, the overall construction can again be simplified, as the transverse distribution device and the operating platform do not each require a separate guiding device.

The paving screed is normally pulled by the tractor of the compact paver by means of two towing arms. The front area of these towing arms is preferably mounted in a height-adjustable fashion on the machine frame in order to set the angle of application of the paving screed in relation to the machine frame during the paving operation. Behind this in the paving direction is a further height-adjustment device by means of which the paving thickness can be varied and by means of which the paving screed can be raised further for transport purposes. In order to be able to compensate for the different possible positions of the paving screed rendered possible thereby in relation to the operating platform in an optimal fashion, the coupling between the paving screed and the operating platform is preferably configured in such a way that it compensates automatically or functions just as reliably in these different relative positions. It is thus preferable if a sliding roller is provided on the paving screed as a counterpart to the stop on the operating platform. The sliding roller is thus normally arranged on the upper side of the paving screed and constitutes the lifting tab on the paving screed. Its counterpart, a contact surface for the roller, is preferably provided on the underside of the operating platform as the tab counterpart in order to provide a rolling area for the sliding roller. Alternatively, this arrangement can also be reversed so that the sliding roller is arranged, in particular on the underside, of the operating platform and the paving screed comprises the corresponding contact surface. The advantage of this arrangement is that a translation of movement is rendered possible from the paving screed to the operating platform, even at different angles of application of the paving screed and at different raised positions.

A further aspect of the invention is an operating platform in and of itself, which is configured for a compact paver with the features described above.

Finally, the invention relates to a method for coordinating the operating position of an operating console of an operating platform of a compact paver with a rear operating step and a higher front operating step of the operating platform, in particular with a compact paver in accordance with the invention. By means of the coordination of these operating positions, it becomes possible to create a comparable operating environment for an operator both on the rear operating step as well as on the front operating step, in particular without necessitating a significant change in the operator's posture. In accordance with the invention, an adjusting, in particular a pivoting, of the operating console between a position associated with a lower operating position and a position associated with a higher operating position occurs when changing between a lower operating position and a higher operating position. The position of the operating console is thus respectively adapted for use by an operator from either the front or rear operating step. The adjustment here in accordance with the invention occurs at least partially in the paving direction or contrary to the paving direction of the compact paver.

The advantages of the method according to the invention become particularly clear when, in addition to the adjustment of the operating console, there further occurs an adjustment, in particular through extraction/insertion, of the position of a seat or back support on the operating platform of the compact paver between a position (second position) associated with a lower operating position and a position (first position) associated with a higher operating position of the operating console on the operating platform. This additionally increases the operating comfort for the operator. In this regard, reference is additionally made to the statements made above regarding the compact paver in accordance with the invention.

Furthermore, the seat can also be adjusted between a sitting operating position and a standing operating position for the front operating step and the rear operating step, in particular by means of a pivoting of the seat shell or an extraction/insertion of the seat. In this regard as well, reference is additionally made to the statements made above.

BRIEF DESCRIPTION OF THE DRAWINGS

The invention is described below in greater detail by means of examples. Repetitive elements in the figures are not necessarily indicated in every figure with a reference number. The figures show schematically:

FIGS. 1A, 1B and 1C are side views of a compact paver with different elevated positions of an operating platform, a transverse distribution device and a paving screed;

FIG. 2 is a side view of the operation platform with an operating console in the higher position and a seat in a sitting operating position in the higher position;

FIG. 3 is a side view of the operating platform of FIG. 2 with an operating console in the higher position and a seat in the sitting operating position in the higher position;

FIG. 4 is an oblique perspective of the operating platform of FIG. 3 from the rear left;

FIG. 7 is a side view of the transverse distribution device, the paving screed and the operating platform shown in FIG. 1A;

FIG. 8: First oblique perspective of the arrangement shown in FIG. 7;

DETAILED DESCRIPTION

Figure 5:
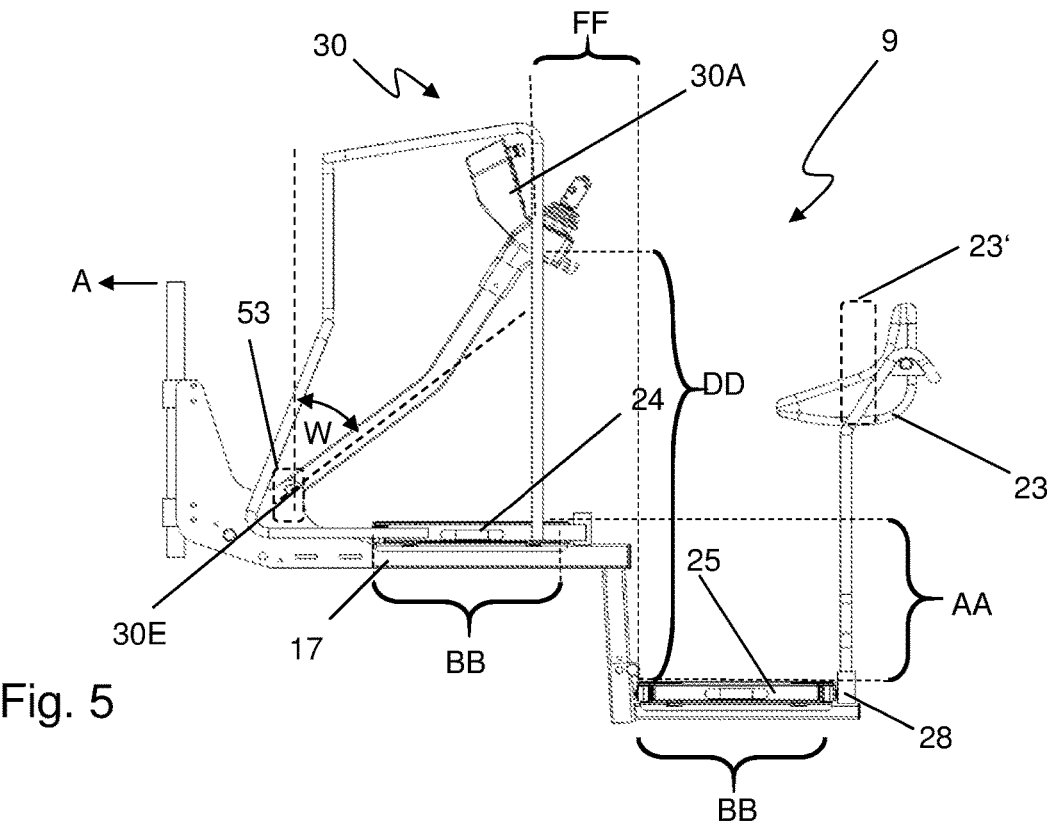
FIG. 5 is a side view of the operating platform of FIG. 2 with the operating console in the lower position and the seat in the sitting operating position in the lower position.
Figure 6:
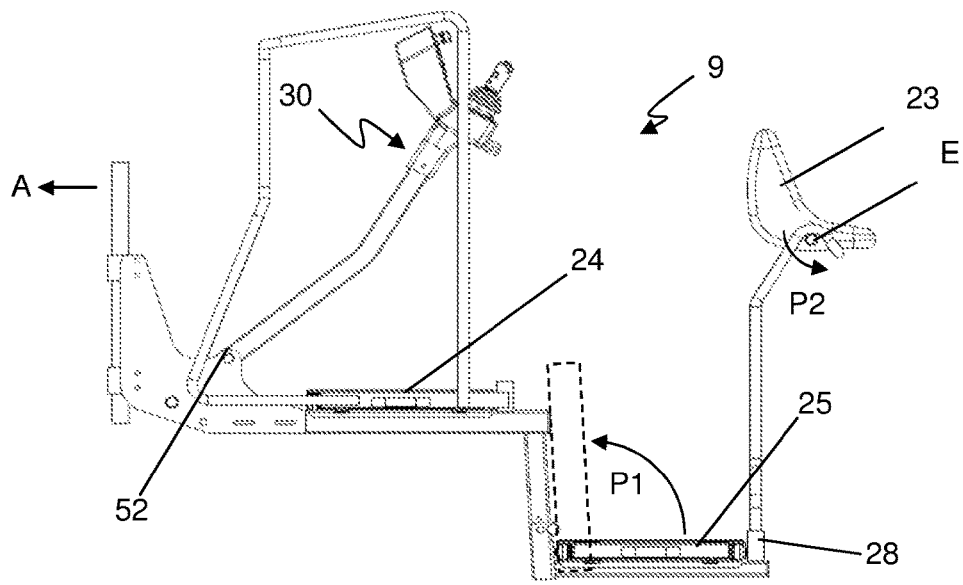
FIG. 6 is a side view of the operating platform with the operating console in the lower position and the seat in the standing operating position in the lower position.

The essential elements of the compact paver 1 can be seen in FIGS. 1A, 1B and 1C.

The compact paver 1 comprises a machine frame 2, a drive motor 3, travel units 4, in this specific example crawler tracks, a receiving container 5, a longitudinal conveying device 6 (merely suggested in FIG. 1A), e.g. a scraper floor with which paving material can be conveyed from the receiving container 5 opposite the paving direction A rearward, a transverse distribution device 7 that is height-adjustable in relation to the machine frame 1 in the direction of the arrow B, specifically comprising a screw conveyor with rotational axes running horizontally and transversely to the paving direction A, a paving screed 8 provided for compacting and smoothing the paving material distributed transversely that is height-adjustable in relation to the machine frame 1 in the direction of the arrow C and that is arranged behind the transverse distribution device 7 in the paving direction A, and an operating platform 9 that is height-adjustable within an adjustment range VB (FIG. 8) in the direction of the arrow D in relation to the machine frame. In FIG. 1A, the transverse distribution device 7 is let down e.g. to its maximum lowered position and the paving screed 8 is swung up to its maximum elevated position. By comparison, the transverse distribution device 7 in FIG. 1B is raised to its maximum elevated position and the paving screed 8 is lowered as far as it will go. Finally, in FIG. 1C both the transverse distribution device 7 and the paving screed 8 are in the maximum lowered position.

The height adjustment of the transverse distribution device 7 and the paving screed 8 affect the elevation of the operating platform 9 at least within the adjustment range VB. This is illustrated in particular by FIGS. 1A, 1B and 1C. In FIG. 1A, the underside of the operating platform 9 lies in the manner described below in greater detail on the paving screed 8 which holds it in its elevated position. In FIG. 1B, on the other hand, the elevation of the operating platform 9 is determined by the raised transverse distribution device 7. Finally, in FIG. 1C the operating platform 9 is in its maximum lowered position, as are the transverse distribution device 7 and the paving screed 8. In this situation, the operating platform is held in its position by a tab on the machine frame 2, as further illustrated below. The operating platform 9 in the present example does not have its own drive for adjusting its height. The height adjustment of the operating platform 9 and the holding of the operating platform it its respective position essentially occur by means of the paving screed 8 and/or the transverse distribution device 7. This is illustrated further in FIGS. 7 to 11.

The specific configuration of the operating platform 9 is essential for the present invention. In this regard, reference is made in particular to FIGS. 2 to 6, which especially illustrate further details regarding the specific structure of the operating platform 9. The latter comprises two levels vertically spaced apart from one another on either of which an operator can stand in order to operate the compact paver 1. These are designated as the front operating step 24 and the rear operating step 25. Offset to the front in the paving direction A is the higher operating step 24, which is located in the vertical direction directly above the upper side of the paving screed 8 (FIGS. 1A to 1C). Offset to the rear a second, lower operating step 25 is provided. In the vertical direction, the operating steps 24 and 25 are spaced apart by a distance AA (FIG. 5). Both operating steps 24 and 25 each essentially form a flat and horizontal standing platform for the driver from which he/she can control the functions of the compact paver 1 during paving operation or transport. In the paving direction, both operating steps have a horizontal length BB (FIG. 5). Transversely to the paving direction, both operating steps 24 and 25 have a horizontal width CC (FIG. 4) that essentially corresponds to the track width of the compact paver 1.

Furthermore, an operating console 30 is arranged on the operating platform 9 by means of which the compact paver 1 is controlled by an operator on the operating platform 9. The operating platform 9 comprises an operating panel 30A with operating elements 30B, in particular joysticks, and supporting bars 30C. In the present example, the operating panel 30A has two identical operating elements 30B, spaced apart horizontally and transversely to the paving direction A, with identical operating functions. These are both arranged approximately at the level of a third of the width, transversely to the paving direction A, and thus equidistant from each other and from the sides. The operating panel 30A is connected with a supporting frame 17 of the operating platform via the two supporting bars 30C by means of a pivot joint 30D and pivotable about the pivot axis 30E (FIG. 5) running horizontally and transversely to the paving direction A by the angle W between a higher operating position (FIGS. 2, 3 and 4) and a lower operating position (FIGS. 5 and 6) by means of a pivot joint 52. The vertical distance EE of the operating panel 30A in the higher operating position (FIG. 3) to the front operating step 24 essentially corresponds to the vertical distance DD of the operating console 30A in the lower operating position (FIG. 5) to the rear operating step 25. The horizontal distance GG of the operating panel 30A in the higher operating position (FIG. 3) in the paving direction A to the front edge of the front operating step 24 is marginally smaller than the horizontal distance FF of the operating panel 30A in the lower operating position (FIG. 5) to the front edge of the rear operating step 25. This way, the adjustability of the operating console 30 is coordinated with the position of the front operating step 24 in relation to the rear operating step 25 so that extremely similar spatial operating conditions are obtained for the operator on each of the operating steps 24/25 for one and the same operating console 30 or operating panel 30A. This way, the operator does not have to change positions or adopt an uncomfortable position in order to actuate the operating elements 30B from the two operating steps 24 and 25. The relative positions of the front operating step 24 and the rear operating step 25 are thus compensated by means of the adjustability of the operating console 30.

Moreover, a locking device 53 (FIG. 5) is also provided. This locking device 53 is designed to lock the operating console 30 in different pivoted positions. In this regard, the locking device 53 can facilitate a continuous or graduated locking of the operating console between both pivoted final positions of the operating console 30. For example, the locking device can comprise a bolt and/or clamping device for locking the pivot joint in question.

The essential supporting structure of the operating platform 9 is realized by means of a supporting frame 17 (FIG. 5) with which the front operating step 24 is connected in a fixed manner. The rear operating step in the paving direction A, on the other hand, is configured in the present example in such a manner that it can be pivoted up or against the rest of the operating platform 9 about an axis that is horizontal and transverse to the paving direction, as suggested by the arrow P1 and the dotted outline of the final upswung position of the rear operating step 25 shown in FIG. 6. This way, the transport length of the compact paver 1 can be reduced and/or the paving process can be started close to obstacles to the rear. By means of the supporting frame 17, the operating platform 9 is arranged in a height-adjustable manner on the machine frame of the compact paver. Furthermore, a railing 33 is arranged on the supporting frame 17 of the operating platform 9. The railing 33 is mounted exclusively on the operating platform 9 and offers the operator on the operating platform 9 protection to the front and rear against falling.

For the operating steps 24 and 25, laterally extendable extension pieces 29 (FIG. 4) can be provided, with which the horizontal extension of both operating steps 24 and 25 can be increased (also beyond the track width of the compact paver 1) and reduced. These extension pieces can thus be slid horizontally in relation to the supporting frame 17.

The operating comfort of the compact paver 1 in accordance with the invention is also further improved by the provision of a seat 23 arranged on the operating platform 9. The seat is configured in such a manner that it can be adapted in different ways to the respective working environments of the compact paver 1 in order to allow the operator the most comfortable posture possible for the operation of the compact paver 1 both from the front operating step 24 and from the rear operating step 25. Here, in a first aspect, the seat 23 essentially comprises a frame 26 and a seat shell 27. The seat shell 27 can be configured so as to be rotatable in relation to the frame 26 and can be swung down about a pivot axis E running horizontally and transversely to the paving direction A from the standing operating position shown in FIG. 6, in which the operator can lean with his/her back against the part of the seat shell 27 that protrudes horizontally, into a swung-down, sitting operating position in the direction of the arrow P2, as the result of which the operator can now sit (sitting operating position). Additionally or alternatively, the same functionalities can also be realized by mounting the seat 23 on the operating platform 9 so as to be rotatable by 180° about a vertical axis. This is achieved in the present example particularly well by configuring the supporting frame 26 of the seat 23 to be insertable in two different insertion positions 28 on the operating platform 9. In the position shown in FIGS. 3 to 4, the seat 23 is inserted in an insertion position 28 associated with the front operating step 24. The seat 23 is thus mounted in the rear area of the front operating step 24 in relation to the paving direction of the compact paver 1. It can be extracted from this position and alternatively inserted in the insertion position 28 associated with the rear operating step. This is practical when, e.g. the compact paver 1 is operated in a working environment with little headroom.

FIG. 4 illustrates that several insertion positions 28 can be provided for the seat 23 on both the operating steps 24 and/or 25. In the present example, a total of four insertion positions 28, evenly spaced apart from one another in the horizontal plane, are provided for the front operating step 24 so that the seat 23 can be placed in a right, middle or left insertion position (as shown in FIG. 4) in relation to the paving direction A. For the rear operating step 25, the example merely shows two insertion positions 28 with which the seat can be placed in a more central position. However, several positions for the seat 23 are also possible on the rear operating step 25.

FIG. 4 also shows that two operating elements 51, spaced apart from one another transversely to the working direction, are provided on the operating console 9, specifically respectively approximately one third of the width away from the sides. This way, similar operating conditions can be guaranteed for each insertion position on the upper operating step 24 for one of the functionally redundant operating elements 30b.

In FIG. 5, instead of a seat 23, an alternative back support 23' is suggested by means of the dotted line.

FIGS. 7 to 11 illustrate further details of the height adjustment of the entire operating platform 9 in relation to the tractor of the compact paver 1 depending on the elevation of the transverse distribution device 7 and/or paving screed 8.

For the sake of clarity, the majority of the tractor T (FIG. 1A) of the compact paver is not visible in the view shown in FIG. 8. The frame-like supporting structure shown in FIG. 8 is part of the machine frame 2 of the tractor T of the compact paver 1. The supporting structure 10 comprises mounting bars 11, which form part of a sliding guide mechanism described in greater detail below. FIG. 8 further illustrates that the transverse distribution device 7 has two distribution screws 15 mounted on and protruding horizontally from a mounting arm 12, which extends downward in a vertical direction. These are rotatable about a horizontal axis running transversely to the paving direction A and thus distribute paving material on the ground surface in a lateral direction. Behind the transverse distribution device 7 in the working direction A, the paving screed 8, mounted in a known manner by means of towing arms 14 on the machine frame 1, is visible in FIG. 8. The paving screed 8 is vertically pivotable about a horizontal pivot axis in a known manner by means of a cylinder-piston unit (not shown in the figures) arranged between the machine frame 2 and the paving screed 8 or towing arms 14. The transverse distribution device 7 is mounted in a slidable manner in a vertical direction in the mounting bars 11 of the machine frame 2 with a mounting bracket 15 connected to the mounting arm 12. The sliding motion is driven by a cylinder-piston unit 16, which is connected on the side of the piston with the transverse distribution device 7 and on the side of the cylinder with the machine frame 1. If the cylinder-piston unit 16 is extended, the distribution screws 13 of the transverse distribution device are lowered and vice-versa.

The operating platform 9 is also connected to the mounting bars 11. It thus has two mounting plates 18 arranged on the supporting frame 17, each with two mounting braces 19 that are spaced apart from one another in the vertical direction. These grip the mounting bars 11 and are slidable along the mounting bars 11 in a vertical direction.

Figure 9:
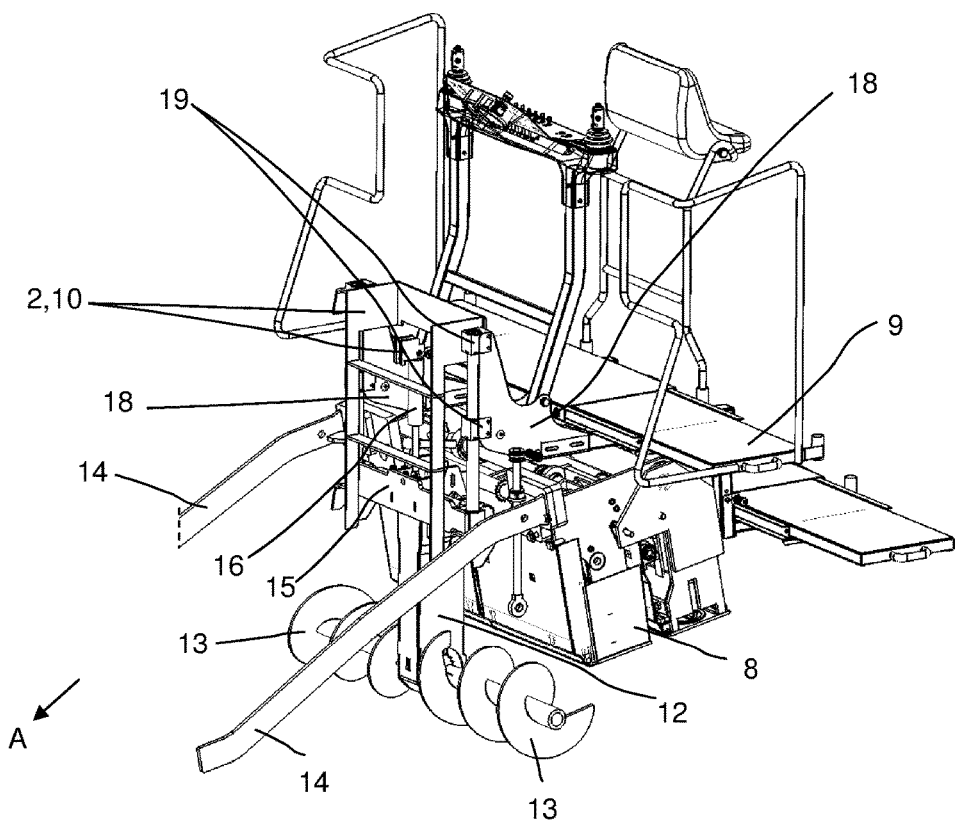
FIG. 9: Second oblique perspective of the arrangement shown in FIG. 7.

The height adjustment of the operating platform 9 in relation to the tractor T within the adjustment range VB (FIG. 8) occurs passively or indirectly via the height adjustment of the transverse distribution device 7 and/or paving screed 9. In the position shown in FIG. 7, the paving screed 8 is raised. It thus hits the underside of the operating platform 9, which it pushes vertically upward as it swings upward. Sliding rollers 20 are provided on the screed 8 for the impact with the operating platform (in FIG. 7, e.g., the outer left sliding roller 20 is visible). This is helpful as the pivoting movement of the paving screed is uneven while the operating platform should be raised in a linear fashion. There is a corresponding sliding surface on the underside of the operating platform 9 on which the sliding roller 20 can roll. If the paving screed 8 is lowered from the position shown in FIGS. 7 to 9, the operating platform 9 is also lowered by the effect of gravity. In FIGS. 7 to 9, the operating platform 9 is thus held at its elevated position within the adjustment range VB by the paving screed 8.

Figure 10:
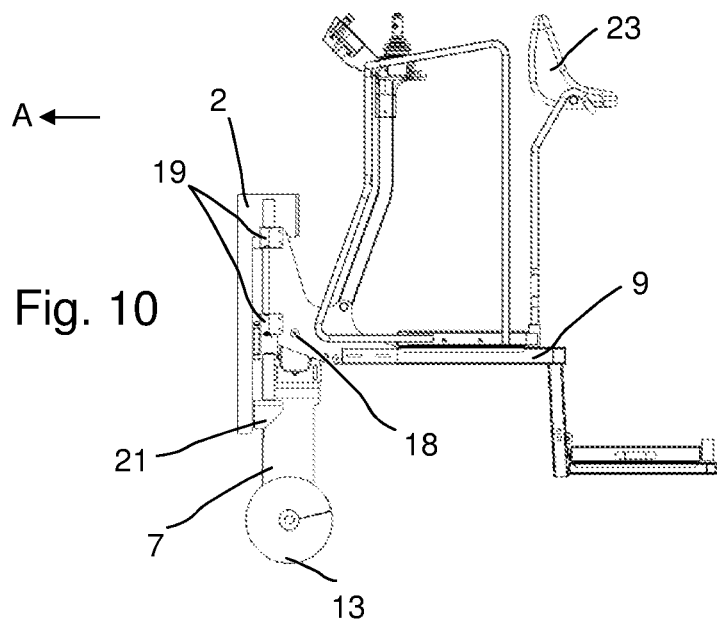
FIG. 10 is a side view of the arrangement shown in FIG. 1B with the operating platform, transverse distribution device and a part of the machine frame.
Figure 11:
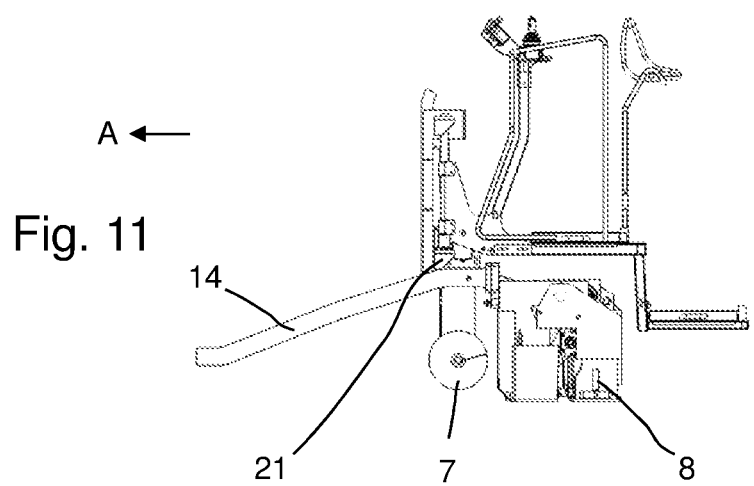
FIG. 11 is a side view of the arrangement shown in FIG. 1C with the operating platform, paving screed, transverse distribution device and a part of the machine frame.

By contrast, FIG. 10 shows how the operating platform 9 is held at its elevated position within the adjustment range VB by the transverse distribution device 7. The paving screed 8 is pivoted downward, as shown in the corresponding FIG. 1B, so that it is no longer in contact with the underside of the operating platform 9. In the maximum lowered state the mounting bracket 15 of the transverse distribution device sits on the stop tabs 21, which are arranged at the lower end of the mounting bars 11 on the side of the machine frame 2. These thus block the downward path of the mounting bracket 15 on the mounting bars 11. If the mounting bracket 15 with its braces embracing the mounting bars 11 is pushed upward, these enter into contact, as shown e.g. in particular in FIG. 10, with the mounting sleeves 19 of the operating platform 9. The mounting bracket 15 thus forms a stop 22 of the transverse distribution device 7 at this point on the operating platform 9. If the transverse distribution device 7 is moved along the supporting bars 11 by the cylinder-piston unit 16, the operating platform 9 is carried along. A separate drive for the height adjustment of the operating platform 9 is thus not necessary in accordance with this arrangement. Finally, FIG. 11 relates to the situation shown in FIG. 1C. Here both the transverse distribution device 7 and the paving screed 8 are in a maximum lowered position.

Figure 12:
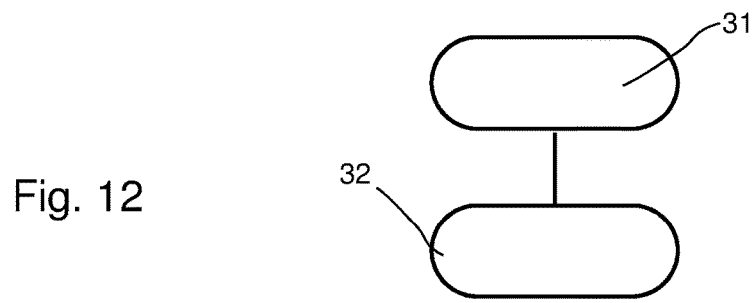
FIG. 12 is a schematic diagram of the method in accordance with the invention.

Finally, FIG. 12 illustrates a preferred method for coordination the operating position of an operating console of an operating platform of a compact paver, in particular in accordance with the invention, with a rear operating step and an operating step positioned vertically higher on the operating platform, including an adjustment 31, in particular a pivoting of the operating console between a position associated with a lower operating position and a position associated with a higher operating position, wherein the adjustment occurs at least partially in the paving direction of the compact paver or contrary to the paving direction of the compact paver, and also an adjustment 32, in particular by means of extraction/insertion, of a position of a seat between a position associated with a lower operating position and a position associated with a higher operating position of the operating console on the operating platform.

What is claimed is:

1. A compact paver comprising:
a machine frame;
a drive motor;
travel units;
a receiving container located in a front in relation to a paving direction for receiving paving material;
a longitudinal conveying device, with which the paving material is conveyable from the receiving container rearward in relation to the paving direction;
a transverse distribution device, with which the paving material is distributable on a ground surface transversely to the paving direction;
a paving screed that is height-adjustable in relation to the machine frame for compacting and smoothing the paving material distributed transversely on the ground surface behind the transverse distribution device in the paving direction; and
an operating platform mounted on the machine frame and arranged behind the receiving container in the paving direction,
wherein the operating platform has a front operating step and a rear operating step arranged so as to be offset in relation to one another in the paving direction of the compact paver, wherein the front operating step in the paving direction is higher than the rear operating step, and that an operating console mounted in a height-adjustable manner is provided, said operating console being adjustable between a higher operating position and a lower operating position, such that the higher operating position of the operating console is closer to the receiving container in the paving direction and higher in a vertical plane than the lower operating position of the operating console.

2. The compact paver according to claim 1, wherein the operating console is pivotable between the higher operating position and the lower operating position.

3. The compact paver according to claim 1, wherein the operating console is mounted in an adjustable manner on a supporting frame of the operating platform.

4. The compact paver according to claim 1, wherein the operating console comprises at least one operating element and that an adjustability of the operating console is configured such that a vertical distance and/or a horizontal distance of the at least one operating element in the higher operating position to the front operating step essentially corresponds to a vertical distance and/or a horizontal distance of the at least one operating element in the lower operating position to the rear operating step, with a maximum deviation of +/−20%.

5. The compact paver according to claim 1, wherein the front operating step and the rear operating step have at least one of the following features:
the front operating step and the rear operating step are arranged so as to be adjacent to one another in the paving direction;
the front operating step and the rear operating step form an overall rigid structure in relation to one another by a supporting frame;
a standing surface of the front operating step and/or a standing surface of the rear operating step has a longitudinal extension in a working direction of the compact paver of at least 300 mm; and
a standing surface of the front operating step and a standing surface of the rear operating step are spaced apart from one another in the vertical plane by a distance in a range between 300 mm and 600 mm.

6. The compact paver according to claim 1, wherein the operating console has at least one of the following features:
the operating console is connected to a supporting frame of the operating platform by a pivot joint, wherein a pivot angle between the lower operating position and the higher operating position is smaller than 70° and greater than 25°;
the operating console comprises at least two supporting bars spaced apart from one another in a horizontal direction transverse to the paving direction, at a foot of which a pivot joint is arranged and at a head of which in the vertical plane an operating panel with at least one operating element is arranged;
the operating console comprises a releasable mechanical locking device via which the operating console is lockable in the higher operating position and/or in the lower operating position; and
the operating console is mounted such that the operating console is adjustable in a continuous or a graduated fashion between the lower operating position and the higher operating position.

7. The compact paver according to claim 1, wherein the compact paver has a seat or a back support with at least one of the following features:
the seat or back support is adjustable between a first position associated with the front operating step and a second position associated with the rear operating step, within the operating platform;
the seat or back support is adjustable between a right operating position and or a left operating position and/or a middle operating position, on both the front operating step and the rear operating step;
the seat or at least a seat shell of the seat is adjustable between a sitting operating position and a standing operating position; and
the seat or back support comprises a releasable mechanical locking device by which the seat or back support is lockable in a releasable manner in an operating position.

8. The compact paver according to claim 1, wherein an adjustability of the operating console and a positioning of a seat or a positioning of a back support is configured such that a horizontal distance and/or a vertical distance at least of an operating element of the operating console in the higher operating position to the seat in a first position or to the back support in a first position, essentially corresponds to a horizontal distance and/or a vertical distance of the at least one operating element in the lower operating position of the operating console to the seat in a second position or to the back support in a second position, with a maximum deviation of +/−15%.

9. The compact paver according to claim 1, wherein an adjustability of the operating console and a positioning of a seat or a positioning of a back support is configured such that a horizontal distance and/or a vertical distance of at least one operating element of the operating console in the higher operating position to the seat in a first position or to the back support in a first position, is smaller than a horizontal distance and/or a vertical distance of the at least one operating element in the lower operating position of the operating console to the seat in a second position or the back support in a second operating position, by a factor of at least 0.7.

10. The compact paver according to claim 1, wherein the operating platform is arranged in a height-adjustable manner on the machine frame of the compact paver such that a height adjustment of the operating platform is coupled with a height adjustment of the paving screed and/or with a height adjustment of the transverse distribution device.

\* \* \* \* \*